United States Patent [19]

Moot

[11] 3,774,523

[45] Nov. 27, 1973

[54] CORN POPPER

[75] Inventor: John R. Moot, Cambridge, Mass.

[73] Assignee: Cornwall Corporation, Boston, Mass.

[22] Filed: Dec. 10, 1971

[21] Appl. No.: 206,790

[52] U.S. Cl. .................................. 99/323.8, 99/534
[51] Int. Cl. ........ A23l 1/18, A47j 37/10, B05c 5/02
[58] Field of Search.................. 99/323.8, 345, 516, 99/534, 346; 118/24, 25, 300

[56] References Cited
UNITED STATES PATENTS
1,839,671  1/1932  Hale.................................. 99/323.8

Primary Examiner—Wayne A. Morse, Jr.
Assistant Examiner—Alan I. Cantor
Attorney—C. Yardley Chittick et al.

[57] ABSTRACT

A cornpopper having a butter holding, melting and dispensing device incorporated in the base member.

16 Claims, 7 Drawing Figures

PATENTED NOV 27 1973
3,774,523
SHEET 2 OF 2
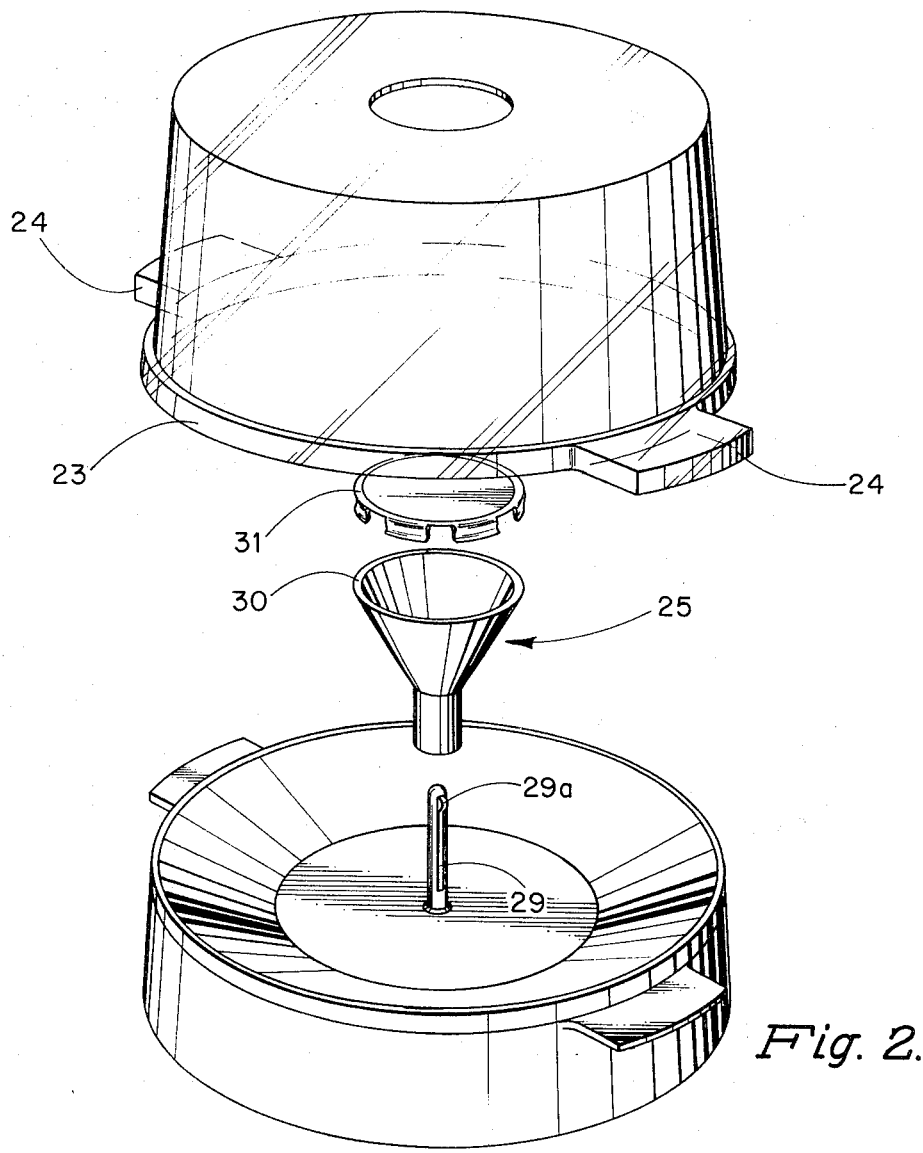
Fig. 2.
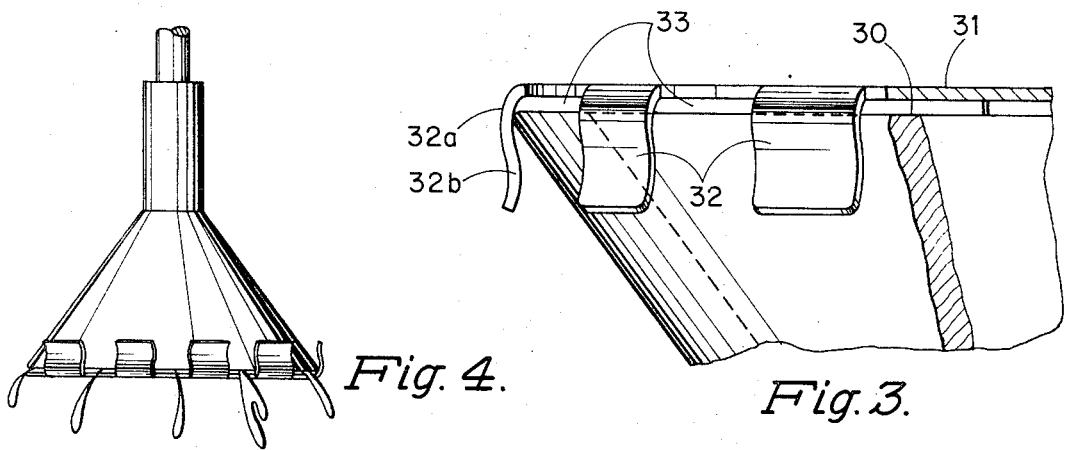
Fig. 4.
Fig. 3.

CORN POPPER

FIELD OF THE INVENTION

This invention pertains to corn poppers, and more particularly to electrical housewares equipment or apparatus for cooking or heating popcorn kernels so as to convert them to the well-known "popcorn" confection.

BACKGROUND OF THE INVENTION

In the typical home cornpopper operation, the first kernel may pop in about five minutes, and another five minutes may be required to complete the popping of all the corn.

Popcorn is currently served with melted butter. Popcorn consumers would be convenienced, then, by an apparatus automatically accomplishing the melting of the butter, and self-dispensing or distributing of it over the popped corn; or by, in other words, a self buttering cornpopper.

Prior attempts at incorporating self buttering have included providing the cornpopper cover with a perforated well receiving the solid butter quantity, from which the butter drops as it softens, regardless of the progress of the corn popping.

With variations in the amount of popcorn to be popped, and/or in the temperature of the popping device, and of the butter, it is difficult to design a unit that performs properly under all circumstances.

More particularly, with the butter in a perforated container or well at the top or cover, it is difficult to have the butter melt and drip through at exactly the right time, and at the same speed as that at which the popcorn is popped.

Thus, with the cover-carried butter holder, if the butter begins to drip through before enough popcorn has popped, it will interfere significantly with the proper popping of the corn.

On the other hand, if it takes too long to melt through, the corn may be entirely popped before the butter is melted. In that event, it may be necessary to wait for several minutes for the butter to complete melting; and the last part of the butter will all be at the top of the cover, which becomes the bottom of the bowl, which makes mixing up difficult.

To avoid and overcome the above described difficulties with the prior, cover-carried butter holders of nonmatching the timing of melting the butter with the timing of popping the corn, this invention provides a base-carried butter holder, in which the butter is melted during the early part of the popping cycle, and in which the butter is held until all of the popcorn is popped, whereupon the unit may be inverted, and the melted butter poured as desired onto the top of the corn.

SUMMARY OF THE INVENTION

A self buttering corn popper having a base-carried butter holder, comprising a receptacle or reservoir:
which first melts the butter;
which thereafter holds the melted butter;
and which ultimately dispenses the melted butter when inverted.

The receptacle or reservoir being fixedly or detachably mounted on the base pan side or bottom, and having, broadly, any construction which holds the melting butter separate from the popping corn as the cooking proceeds, and allows the desired dispensing or distribution of the melted butter upon its inverting over the popped corn.

BRIEF DESCRIPTION OF THE DRAWINGS

In the annexed drawings:

FIG. 2 is an assembly view in exploded perspective of the corn popper;

FIG. 3 is a fragmentary view on a larger scale of the butter cup;

FIG. 4 shows the inverting of the butter cup for dispensing the melted butter;

DESCRIPTION OF THE PREFERRED EMBODIMENT

Figure 1:
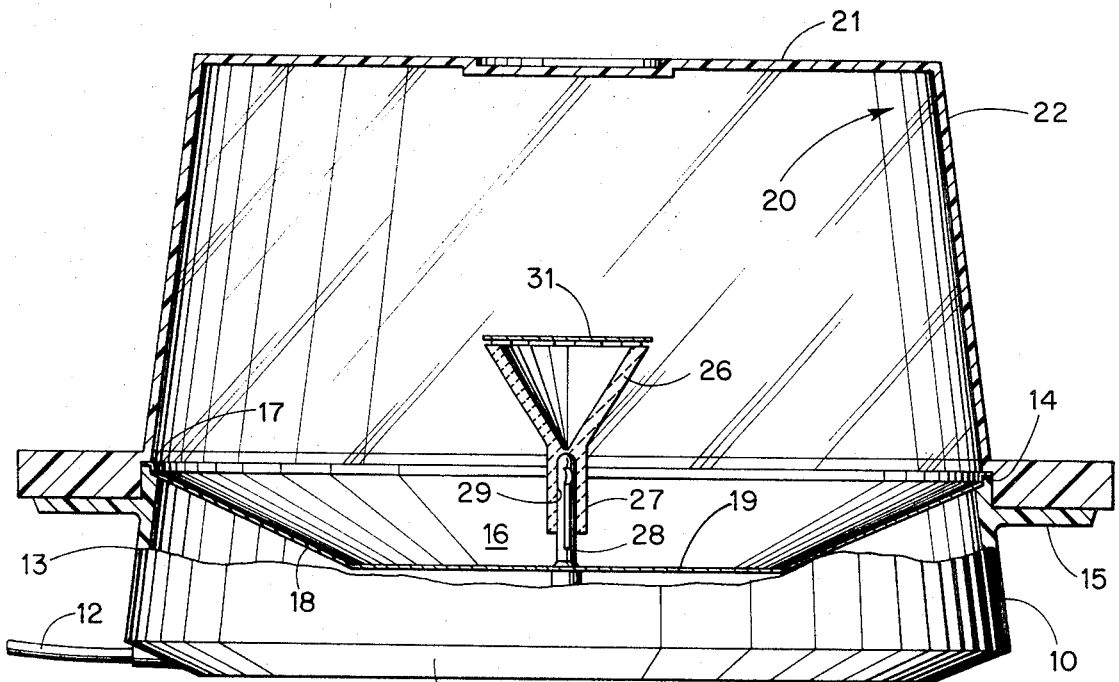
FIG. 1 is a side view of the corn popper, with the base broken away to show the popcorn pan and butter cup.

The corn popper has an annular base 10, which may be of aluminum or other suitable material, and is adapted, as by a flat bottom 11, for resting or supporting on a table, counter or the like. The base 10 is interiorly provided with a usual electrical heating unit (not shown) such as externally connected, as through cord 12, to an electrical outlet.

The hollow base 10 has a herein tapering side wall 13 terminating upwardly in an annular lip or rim 14, and mounting thereat oppositely laterally projecting manipulating arms or handles 15.

Seated or nested on rim 14 is an annular receptacle, dish or pan 16 having a peripheral flange or skirt 17 resting on or fitting over rim 14. Inwardly thereof, pan 16 is defined by the sloping side wall 18, and central, horizontal bottom wall 19 on which are initially deposited the corn kernels which when popped will fill the space provided by that and the dish or pan side 18.

A cover 20, which may be clear plastic, has a top 21 and sloping side 22 terminating downwardly in a rim 23 fitting over base rim 14, and mounting oppositely laterally projecting handles 24 conveniently mating with, or fitting over, for manipulating together with, base handles 15.

In accordance with the invention, base-carried receptacle or holder means are provided:
for receiving and melting a quantity of solid butter deposited therein;
for holding the melted butter until the time chosen for its release; and
for dispensing the melted butter, when the holder is inverted, in desired distribution throughout the fully popped corn.

In the preferred embodiments hereof, the self buttering means comprise a butter cup 25 formed as a cone shaped receptacle or reservoir 26 whose sloping sides are seen not to impede the corn popping, deflecting rather than halting or reversing the flight of the rising kernels that chance to strike them.

The butter cup 25 further comprises a depending stem 27 which may be integrally mounted on, or through, the base receptacle 19, or which, as herein, may be detachably supported therefrom, as facilitates cleaning and replacement of the part.

The butter cup cone 26 and stem 27 may be of integral ceramic construction, or may otherwise be formed of such durable, inert material as may be desired or preferred.

A generally cylindrical butter cup mount, spindle or stud 18 is rigidly mounted in any manner on the base pan 16, or rigidly supported from a base portion underlying that to project through said pan 16, FIG. 2.

In the FIGS. 1 and 2 form the butter cup stem 27 is received over stud 28 by a cylindrical well or bore passage 29 into which said stud 28 has a telescoping or snug sliding fit.

Also in the FIGS. 1 and 2 form, stud 28 is axially recessed to receive a leaf spring detent 29 having a nose 29a camming inwardly into the spring recess upon slipping of the butter cup 25 over the spindle 28, but biasing outwardly against the wall of bore passage 29 with sufficient force or spring bias to frictionally retain or hold the parts 27, 28 when the same are inverted.

Figure 5:
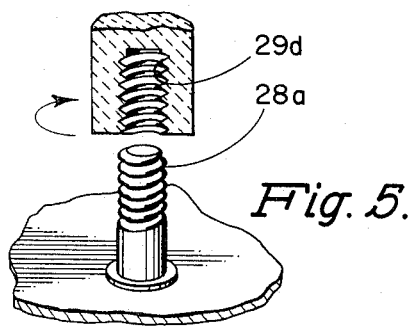
FIGS. 5 and 6 show alternative forms of detachably mounting the butter cup.

In the FIG. 5 modification, the stem 28 and bore passage 29 are formed with mating screw threads 28a, 29d, whereby the butter cup 25 may be rotated or screwed onto and off of the base mount 28.

Figure 6:
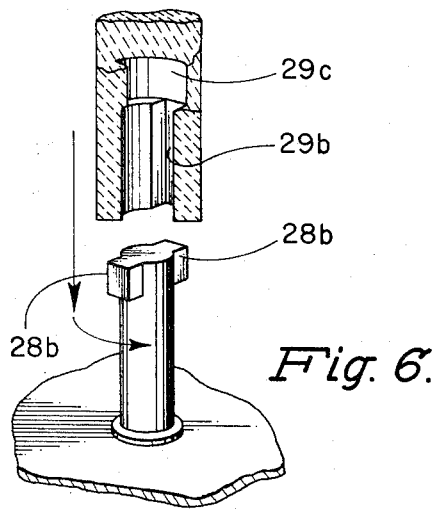

In the FIG. 6 modification the spindle 28 has oppositely projecting terminal ears 28b, and the bore passage 29 has mating axial slots 29b, and a like proportioned, cylindrical, base enlargement 29c, whereby the parts 28, 29 may first be telescoped, and thereafter rotated to turn the ears 28b in the enlargement 29c out of the plane of the slots 29b, and so to releasably lock the butter cup 25 on the stud 28.

Within the scope of the invention, numerous other ways of removably mounting the butter receptacle on the corn popper base may be used, including various forms of split, snap, or spring fastenings such as are conventionally employed for the like, releasably retaining purpose; and also including an elastic annulus forming part of the male, and being axially compressed to radially expand and grip whichever is the female, of the stud and stem parts upon their being axially interfitted or telescoped together.

Obviously, simple screw and nut means may alternatively comprise the separable arrangement, for which, within the invention, any suitable means may be employed.

In accordance with the invention, means are provided for removably closing the butter cup to admit and thereafter retain a buttering quantity of initially solid butter, as a butter pat which may be wiped off a knife or spreader or the like onto rim 30 of cone 26 and which may be of a size or volume when melted to suitably or sufficiently butter the quantity of popcorn for which the popper is designed. The cone 26, or other receptacle, will of course be of a size to accommodate such butter pat, or melted butter volume.

In the FIGS. 1–4 form, the removable closure means comprises a metal or plastic disc 31 of a diameter smaller than that of cup rim 30, and mounting a series of laterally spaced, outwardly projecting, downwardly curving, resilient spring fingers or tabs 32.

In accordance with the invention, the releasably retaining tabs 32 have lower, reversely or inwardly-outwardly curving waist portions 32b which are first pressed or cammed over the cup rim 30.

The tabs 32 have also the upper, outwardly-downwardly curving spring portions 32a which then grip inwardly over the cup rim 30; but in doing so, because their root diameter is less than that of the outer edge of the rim, space the cover disk 31 upwardly from the surface of the rim, as shown, FIGS. 1–4.

Accordingly, in the FIGS. 1–4 embodiment, a plurality of circumferentially distributed, laterally oriented openings 33 are defined between the cone 26 and disc 31, and between the laterally spaced spring tabs 32, from which the melted butter is dispensed or poured in flarent streams upon the inverting of the butter cup, as shown, FIG. 4.

Figure 7:
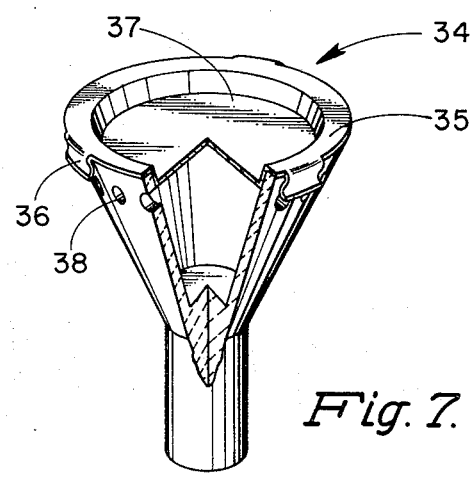
FIG. 7 is a cutaway perspective of a modification of the butter cup.

In the modified form of FIG. 7 a cover 34 has: a radial lip or flange 35 fitting over the cup rim 30; spaced, downwardly projecting spring tabs 36 clamping the cup sides 26; and an inset center 37 engaging or closing at its dished or sloping side against the inner surface of the butter cup side wall 26. A circumferential series of laterally or radially distributed ports or passages 38 are formed in or cut through said cup side wall 26 at a height below the cover center 37, to provide the openings for dispensing the melted butter upon the inverting of the butter cup similarly as shown in FIG. 4 for the FIGS. 1–4 form.

Within the invention, the butter holder cover may be upwardly dished, to afford it a thereby-exposed side wall which may then alternatively or additionally be perforated for the butter dispensing. Or, in whatever form of the cover, the top wall thereof may itself be apertured to provide the melted butter outlets.

In the use and operation of the self-buttering corn popper of the invention, the kernels and oil are deposited in the base receptacle 16, and the butter pat is deposited in the receptacle or cup 26 therefor, with the removable cover 34 being removed and replaced as described. The heating element is then energized, and as the heat cooks the corn, the butter melts.

In accordance with the invention, the melted butter is held within the receptacle or reservoir 25 as the corn popping proceeds to completion, and without interference therewith. The exploding kernels rise past the cup 26 to within their confinement by the cover 20, and fall back onto the base receptacle 16.

Under this invention, the buttering of the cooked popcorn is accomplished when and as wanted, by then gripping the corn popper at the handles 15, 24, inverting the assembly to deposit the popcorn in the cover 20, and then manipulating the corn popper, or the base thereof, as desired to effect whatever wanted distribution of the melted butter over the popped corn.

In this the spreading of the melted butter over an area of the popped corn will be effected with the corn popper base being merely rested on the inverted cover. Alternatively, the inverted base may be lifted from the cover, and laterally shifted to influence or alter the melted butter distribution as desired.

It will also be seen that the melted butter dispensing may be interrupted or halted whenever desired, by simply re-inverting the corn popper base to return the butter cup to the upright position.

From the foregoing it will be understood that the corn popper, with base-carried self buttering means of this invention: provides a butter pat receiving receptacle; provides for the melting of the buttering quantity of solid butter, and also for the holding or storing of the melt of that butter quantity while the cooking of the popcorn proceeds; provides for the separation of the melted butter from the corn kernels as they rise and fall in the corn popper in the course of the exploding thereof; and provides for the desired dispensing of the butter over the fully cooked corn, upon the inverting of the butter cup thereabove, and independently of and without disaffecting the corn popping process.

I claim:

1. In a corn popper,
a base adapted to be rested on a supporting surface;
a heating element within said base;
means associated with said base providing a receptacle for corn to be popped;
a cover fitting over said receptacle;
manipulating handle means by which said base and cover may be inverted; and
means providing self buttering of said corn once popped, said self buttering means comprising
a base-carried butter cup mounted above said receptacle and within said cover,
said butter cup constructed and arranged for receiving a quantity of solid butter suitable when melted for buttering said corn when popped,
removable closure means for said butter cup,
said removable closure means manipulable to open said butter cup to deposit therein of said buttering quantity of solid butter,
said butter cup constructed and arranged also for melting of said solid butter quantity under corn popper heating time and temperature causing said kernels to be popped, and
means aperturing said self buttering means above the level of said melted butter in said cup whereby, when and only when said base is inverted and said popped corn thereby deposited in said cover, said melted butter is enabled and caused to flow out of said cup and drip onto said cover-deposited pop corn.

2. A corn popper according to claim 1, wherein said cup comprises a cone having sloping sides non-interferent with said popping and freely passing said popped corn from said receptacle to said cover when said corn popper is inverted.

3. A corn popper according to claim 1, wherein said butter cup comprises a cone and dependent therefrom a stem.

4. A corn popper according to claim 3, wherein said cone and stem are of integral ceramic construction.

5. A corn popper according to claim 1, and
a mounting stud on said receptacle and
a stem on said cup engaging said stud for removably supporting said cup in butter holding position.

6. A corn popper according to claim 5, wherein said stud and stem are matingly threaded for securing and removing of said cup by its oppositely screwing on and off said stud.

7. A corn popper according to claim 5, wherein said stud and stem have mating key-form projection and recess whereby said cup is first telescoped and then rotated thereon for removably locking it onto said stem.

8. A corn popper according to claim 5, wherein said stud has a spring detent deformably engaged by said stem and biasing thereagainst with sufficient force to retain said cup against falling from said stud when the same are inverted.

9. A corn popper according to claim 1, wherein said removably closing means is a cover comprising
a disc having a periphery smaller than the rim of the cup; and
a plurality of resilient tabs depending outwardly from said disc periphery and curving downwardly and gripping inwardly over said cup rim; and wherein said aperturing means comprise
peripheral openings intermediate said tabs determined by the spacing of said disc above said cup by the engagement of said tabs over said rim.

10. A corn popper according to claim 1, wherein said aperturing means comprise
a series of openings through the wall of said cup.

11. A corn popper according to claim 10, wherein said cup has an annular rim, and wherein said removable closing means comprise
an annular disc member havings its outer radial edge seated on said rim and having an inset portion engaging the inner wall of said cup above the level of said openings.

12. A corn popper according to claim 11, and said disc member having resilient tabs depending from said outer radial edge and spring clamping the outer wall of said cup.

13. In a corn popper
a base adapted to be rested on a supporting surface;
a heating element carried by said base;
means associated with said base providing a receptacle for kernels of corn to be popped;
a cover removably received over said receptacle;
means adapting said base and cover to be manually manipulable; and
means associated with said base providing self buttering of corn once popped, said self buttering means comprising
a reservoir supported within said receptacle, said reservoir;
constructed and arranged for the melting therein of a quantity of solid butter deposited therein appropriate to the buttering of, and during the heating time and temperature for the cooking of, the popcorn deposited in said receptacle;
having underlying and overlying surfaces bypassing the corn kernels as they rise and fall in the corn popper in the course of being popped; and
adapted to dispense said melted butter upon said receptacle being inverted.

14. A corn popper according to claim 13, wherein said reservoir comprises
a cup mounted centrally of said receptacle; and wherein said cup is adapted for said dispensing by peripheral openings constructed and arranged for dispensing said melted butter in a radially distributed pattern.

15. The apparatus of claim 14, wherein said peripheral openings are oriented to pass said melted butter in initially lateral directed streams.

16. A corn popper according to claim 1, wherein at least some of said aperturing means are located in said removable closure means.

* * * * *